United States Patent [19]
Jang

[11] Patent Number: 6,130,646
[45] Date of Patent: Oct. 10, 2000

[54] ANTENNA UNIT FOR PORTABLE COMMUNICATION TERMINAL

[75] Inventor: Chang-Weon Jang, Kyongsangbuk-do, Rep. of Korea

[73] Assignee: Samsung Electronics Co., Ltd., Rep. of Korea

[21] Appl. No.: 09/122,133

[22] Filed: Jul. 24, 1998

[30] Foreign Application Priority Data

Dec. 5, 1997 [KR] Rep. of Korea ................. 97-66382

[51] Int. Cl.⁷ .................................................. H01Q 1/06
[52] U.S. Cl. ................................................ 343/721; 343/702
[58] Field of Search .................................. 343/702, 721, 343/895, 872; 455/89, 90

[56] References Cited

U.S. PATENT DOCUMENTS

| | | | |
|---|---|---|---|
| 3,506,956 | 4/1970 | Kolm et al. | 343/721 |
| 4,039,894 | 8/1977 | Gardner, III | 343/721 |
| 5,048,118 | 9/1991 | Brooks et al. | 343/702 |
| 5,162,696 | 11/1992 | Goorich | 313/511 |
| 5,448,456 | 9/1995 | Haynh | 343/721 |

FOREIGN PATENT DOCUMENTS

| | | | |
|---|---|---|---|
| 0865098 | 9/1998 | European Pat. Off. | |
| 164224 | 6/1994 | Japan | H01Q 1/06 |
| 7111682 | 4/1995 | Japan | |
| 9167907 | 6/1997 | Japan | |
| 2201550 | 9/1988 | United Kingdom | H01Q 1/06 |
| 2317301 | 3/1998 | United Kingdom | |

*Primary Examiner*—Tan Ho
*Attorney, Agent, or Firm*—Dilworth & Barrese

[57] ABSTRACT

An antenna unit for a portable communication terminal in which an incoming call lamp is mounted to the top of an antenna thereof so that a user can easily identify a ring signal, for example, flickering of the lamp in all directions. The antenna unit for a portable communication terminal includes an antenna which is configured to be mounted on a body of the portable communication terminal; and an incoming call lamp which is fixedly mounted to the top of the antenna.

13 Claims, 4 Drawing Sheets

6,130,646

ANTENNA UNIT FOR PORTABLE COMMUNICATION TERMINAL

BACKGROUND OF THE INVENTION

1. Field of the Invention

The present invention relates to an antenna unit for a portable communication terminal, and more particularly to an antenna unit for a portable communication terminal having an incoming call lamp mounted thereon to function as a ring signal indicator.

2. Description of the Related Art

In general, a portable communication terminal refers to a hand-held portable communication unit such as, for example, a portable cellular telephone, CT-2, a wireless telephone and a car phone, etc. The portable communication terminal typically communicates via radio waves between itself and a base station, and the cellular telephone similarly communicates between a portable unit and a fixed unit.

Recently, the cellular cordless telephone has become smaller in its physical dimensions, due in large part to a continuing trend toward increased electronic component sensitivity and reduced electronic component size. Accordingly, a flip-type cellular telephone of very high sensitivity has enjoyed increasing popularity in telecommunication applications. A flip cover pivotably mounted to the lower portion of a body of the portable communication terminal may be configured to protect a plurality of function buttons on the body as well as house the electronics required to transmit the voice of the user. Furthermore, the portable, flip-type communication terminal may be made smaller than conventional terminals by incorporating state-of-the art electronics.

Such a flip-type communication terminal typically includes a flip cover, a body and a shutting unit (a flip module) connecting the flip cover with the body. A microphone can be positioned at the lowest portion of the body and can also be positioned in the flip cover. The foregoing will be easily understood by those having ordinary skill in the art.

Referring to the embodiment of the prior art as shown in FIG. 1, the portable communication terminal includes a body 10, a flip cover 11 and a flip cover shutting unit pivotally connecting the body 10 with the flip cover 11. Mounted to the middle portion of the front upper side of the body 10 is an incoming call lamp 20 which is turned on when a power supply is switched on, the telephone rings or a message is received. An antenna 30 is mounted to the one end portion of the top side of body 10. A speaker 12 and a LCD window 13 are disposed under the incoming call lamp 20. A plurality of function keys 14 are arranged in a row and column configuration under the LCD window 13, and a microphone 15 and a flip cover 11 are assembled together at the lowest portion of the body 10. As illustrated, the flip cover 11 is mounted to the body 10 in such a manner that it is fitted into the shutting unit included in a housing 16 and may be opened or closed within a predetermined angle range.

However, in the conventional portable communication terminal, a problem exists in that the incoming call lamp is mounted to the front upper side of the body of the portable communication terminal. According to the position of the terminal vis a vis the user, the user may not be able to see the flickering of the lamp.

SUMMARY OF THE INVENTION

It is therefore an object of the present invention to provide an antenna unit for a portable communication terminal in which an incoming call lamp is mounted to the top of an antenna thereof so that a user can easily identify a ring signal by, for example, flickering of the lamp in all directions.

This and other objects of the present invention have been attained by providing an antenna unit for a portable communication terminal including: an antenna which is configured to be mounted on a body of the portable communication terminal; and an incoming call lamp which is fixedly mounted to the top of the antenna.

BRIEF DESCRIPTION OF THE DRAWINGS

A more complete appreciation of this invention, and many of the attendant advantages thereof, will be readily apparent as the same becomes better understood by reference to the following detailed description when considered in conjunction with the accompanying drawings, in which like reference symbols indicate the same or similar element components, wherein.

DETAILED DESCRIPTION OF PREFERRED EMBODIMENTS

Figure 1:
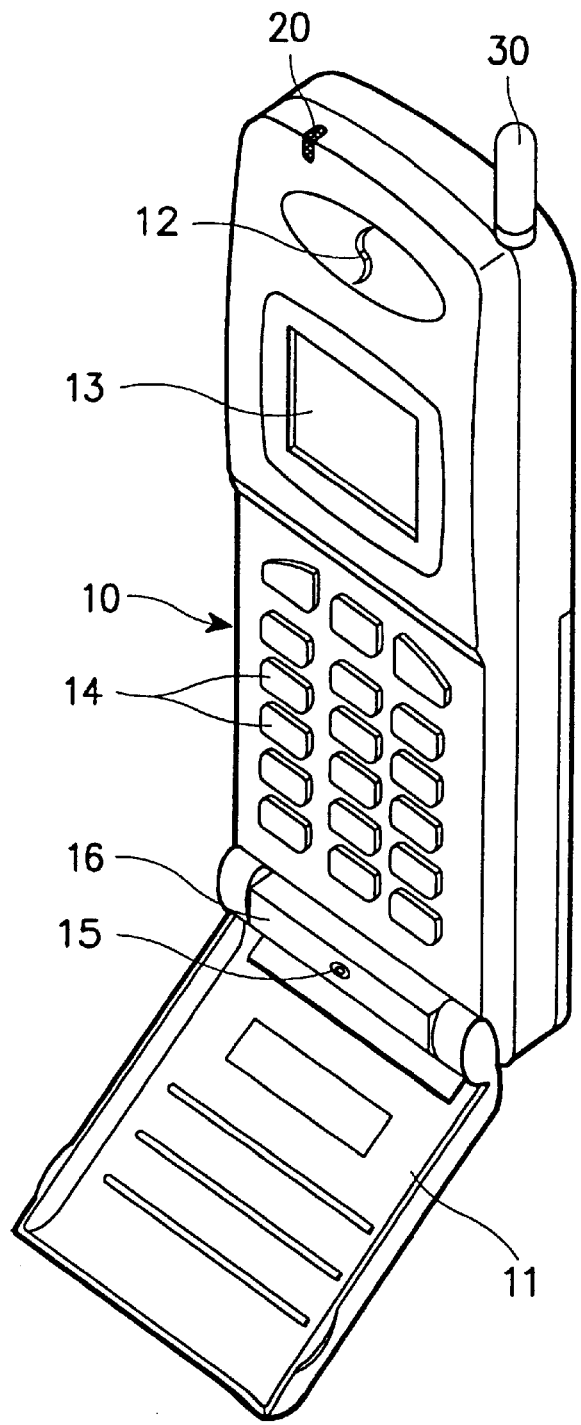
FIG. 1 is a perspective view of a conventional portable communication terminal which is provided with an incoming call lamp mounted on the body portion.

Now, a preferred embodiment of the present invention will be described in detail with reference to the accompanying drawings. Throughout the drawings, it is noted that the same reference numerals or letters will be used to designate like or equivalent elements having the same function. The detailed descriptions of known functions and constructions unnecessarily obscuring the subject matter of the present invention will be avoided hereinafter. Technical terms as will be mentioned hereinbelow are terms defined in consideration of the function in the present invention, which may be varied according to the intention of a user, so the terms should be defined based on the contents across all of this specification.

Now, an explanation of the construction and the operation according to an embodiment of the present invention will be in detail given hereinafter with reference to FIGS. 2 to 4.

Figure 2:
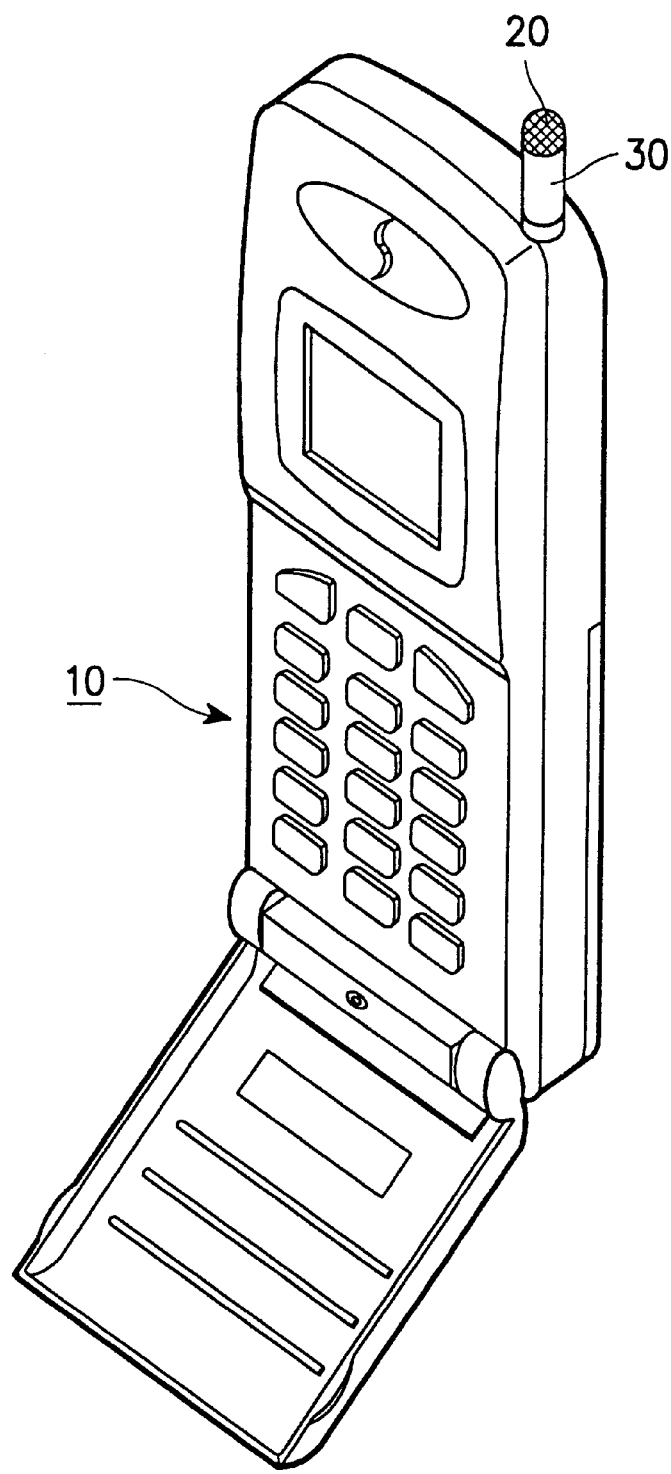
FIG. 2 is a perspective view of a portable communication terminal having an antenna provided with an incoming call lamp according to a preferred embodiment of the present invention.
Figure 3:
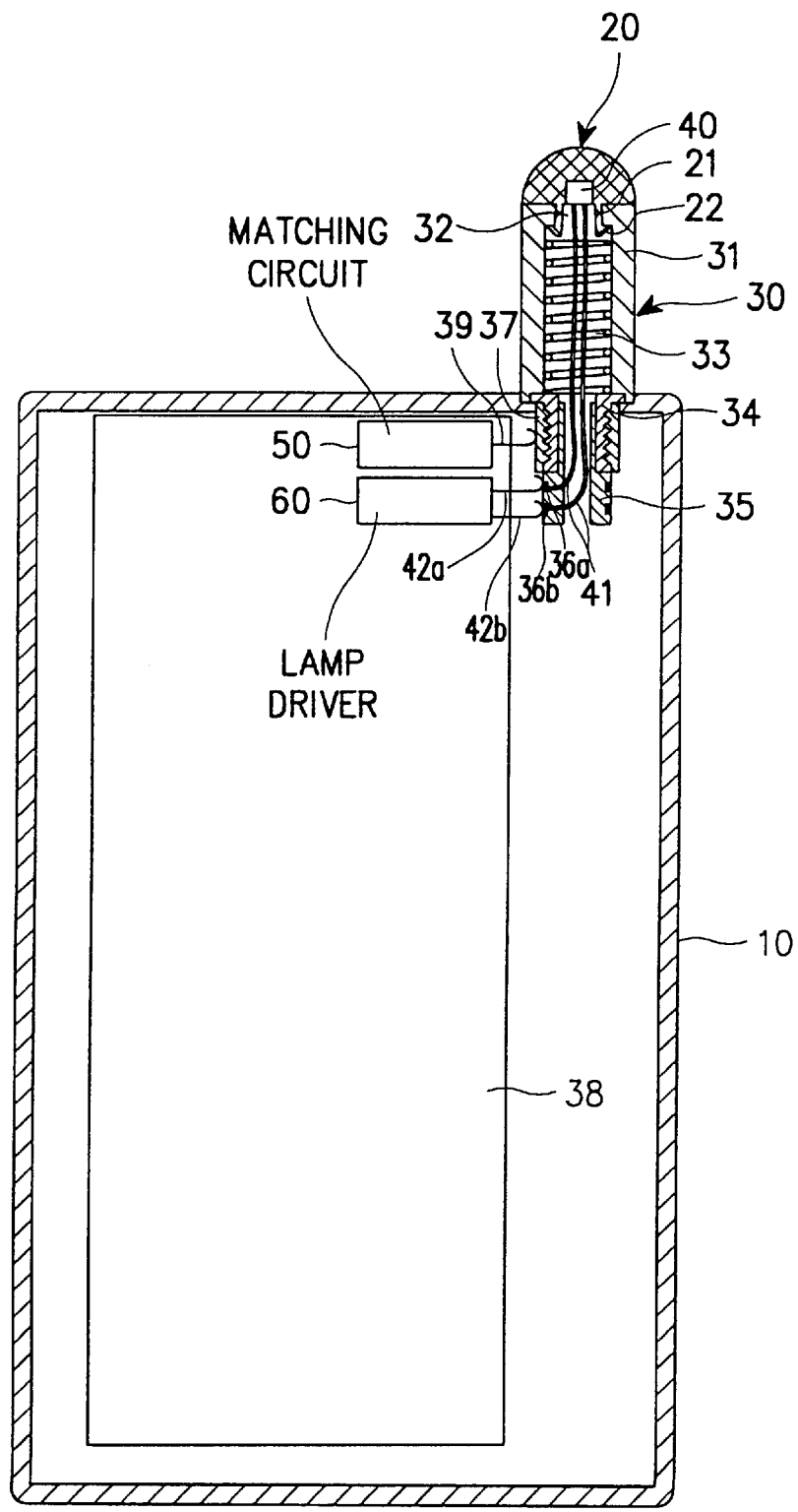
FIG. 3 is a cross-sectional view of an antenna provided with an incoming call lamp having a portable communication terminal according to a preferred embodiment of the present invention.
Figure 4:
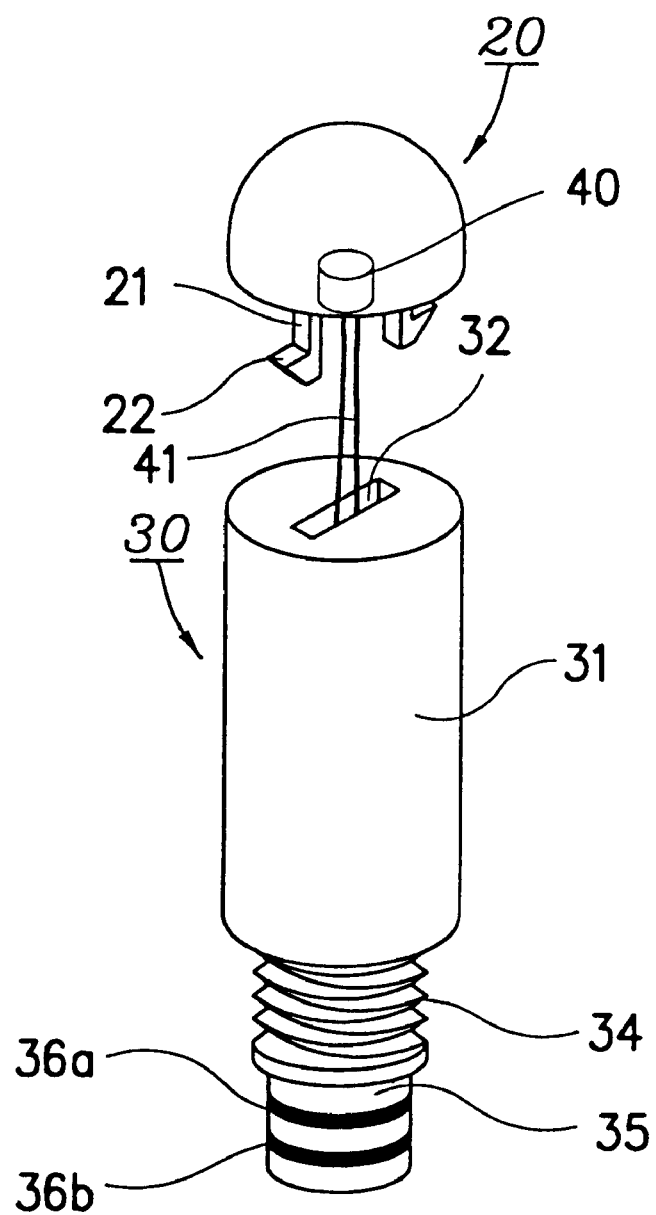
FIG. 4 is an exploded perspective view of an antenna and an incoming call lamp as they appear during the assembly according to a preferred embodiment of the present invention.

In FIGS. 2 and 3, an antenna unit for a portable communication terminal according to the present invention comprises a body 10, an antenna 30 and an incoming call lamp 20.

The antenna 30 which is mounted on one side of the top of the body 10 of the portable communication terminal is provided with an antenna cap 31 of a cylindrical shape having a bore 32 formed therein. The incoming call lamp 20 having a light emitting diode (LED) 40 placed therein is made of a mold material. The incoming call lamp 20 includes two hooks 21 extending downwardly from both sides of the bottom surface thereof and each having an outwardly projected jaw formed at the lower end of the hooks 21. Lamp 20 is fixedly mounted to the antenna 30 in such a manner that the hooks 21 are snap-fit into the bore 32 formed in antenna cap 31. The upper end of a housing connecting portion having antenna windings 33 attached thereon is fitted into the lower portion of bore 32 of the antenna cap 31, so that the antenna windings 33 are housed within antenna cap 31. The housing connecting portion 34 has a cylindrical hole formed longitudinally in the direction of a central axis and a male screw thread formed along the circumferential surface thereof. A flange 35 is fitted into the cylindrical hole of the housing connecting portion 34 during the assembly, and connecting terminals 36a and 36b are disposed on the upper portion and the lower portion of the flange 35. Two wires 41 having first ends attached to the LED 40 are connected at second ends thereof to the connecting terminals 36a and 36b through the bore 32 and the cavity of the antenna cap 31, respectively. The housing connecting portion 34 coupled to the lower end of the antenna windings 33 is secured to the body 10 by means of a conductive ring 37 in such a manner that the male screw thread of the housing connecting portion 34 is fitted into a female screw of the conductive ring 37 provided for the body 10. The conductive ring 37 is electrically connected to a printed circuit board (PCB) 38 through an antenna terminal 39 one end of which is coupled to a matching circuit 50, to complete the impedance matching.

The connecting terminals 36a and 36b are coupled to positive and negative (+/-) connecting terminals 42a and 42b of the PCB 38, respectively. Two wires 41 of the LED 40 are connected to +/- connecting terminals 42a and 42b of the PCB 38 for coupling with a lamp driver 60. The connecting terminals 36a and 36b of the flange 35 are made of a conductive ring. The mold material of the incoming call lamp 20 is made of a transparent rubber or a transparent resin. The antenna terminal 39 and the connecting terminals 42a and 42b are made of a plate spring.

The aforementioned antenna 30 for a portable communication terminal functions as an antenna by means of the antenna windings 33, and as an incoming call indicator by means of the lamp driver 60 which operates the LED 40. The first ends of the wires 41 are connected to LED 40. The second ends of wires 41 are connected to terminals 36a and 36b of the flange 35 which is, in turn, connected to the +/- connecting terminals 42a and 42b . Terminals 42a and 42b are connected to the lamp driver 60. When a power supply is switched on, the telephone rings or a message is received, the incoming call lamp 20, mounted on the top of the antenna cap 31, can be turned on. At this time, the LED 40 of the incoming call lamp 20 radiates a light so that the light is projected in all directions by the transparent mold covering the LED 40, thereby to easily identify a ring signal, for example, via flickering of the lamp.

As described above, the present invention has an advantage that since an antenna having an antenna cap is installed to the one side of the top of a body of a portable communication terminal and an incoming call lamp having a LED placed therein is mounted on the top of the antenna cap, it is possible for a user to easily identify a ring signal.

While there have been illustrated and described what are considered to be preferred embodiments of the present invention, it will be understood by those skilled in the art that various changes and modifications and equivalents may be substituted for elements thereof without departing from the true scope of the present invention. Therefore, it is intended that the present invention not be limited to the particular embodiments disclosed as the best mode contemplated for carrying out the present invention, but that the present invention embraces all alternatives, modifications and variances falling within the scope of the appended claims.

What is claimed is:

1. An antenna unit for a portable communication terminal comprising:

an antenna which is configured to be mounted on a body of said portable communication terminal, the antenna including an aperture located on a top portion of the antenna remote from the body of said terminal; and an incoming call lamp which is fixedly mounted to the top portion of the antenna by friction fit with the aperture.

2. The antenna unit according to claim 1, wherein said incoming call lamp is made of a transparent mold material and has a light emitting diode placed therein.

3. The antenna unit according to claim 2, wherein said light emitting diode of said incoming call lamp is connected to a lamp driver of a printed circuit board through two wires extending in a cavity formed in said antenna.

4. The antenna unit according to claim 2, wherein said mold material of said incoming call lamp is made of a transparent rubber.

5. The antenna unit according to claim 2, wherein said mold material of said incoming call lamp is made of a transparent resin.

6. The antenna unit according to claim 1, wherein said antenna has an antenna cap of a cylindrical shape having a slot formed on the top surface thereof and having a cavity therein, said incoming call lamp is snap-fitted into the slot, an upper end of a housing connecting portion having antenna windings attached thereon is fitted into said cavity of the antenna cap so that said antenna windings can be placed in said cavity of said antenna cap, said housing connecting portion is secured to the body by means of a conductive ring electrically connected to a printed circuit board through an antenna terminal, a flange is fitted into a cylindrical hole formed longitudinally in the direction of a central axis of said housing connecting portion during assembly, two connecting terminals are disposed on an upper portion and a lower portion of said flange, and two wires having a first end attached to said light emitting diode are connected at a second end thereof to said connecting terminals which are further coupled to positive and negative connecting terminals of said printed circuit board.

7. The antenna unit according to claim 6, wherein said incoming call lamp has two hooks extending downwardly from either side of a bottom surface thereof and each hook having an outwardly projected jaw formed at a lower end thereof, for fixedly mounting said lamp to said antenna in such a manner that said hooks are snap-fit into said slot formed on the top surface of said antenna cap.

8. The antenna unit according to claim 6, wherein said housing connecting portion further includes a male screw thread formed along a circumferential surface thereof for engaging a female screw thread formed in the conductive ring.

9. The antenna unit according to claim 6, wherein said connecting terminals of said flange are made of a conductive ring.

10. The antenna unit according to claim 6, wherein said antenna terminal and said connecting terminals are made of a plate spring.

11. A portable communication terminal comprising:

a body portion;

means for receiving and transmitting a radio signal contained within the body portion; and an antenna connected to the body portion, the antenna including an aperture located on a top portion of the antenna remote from the body of said terminal; the antenna having a light emitting diode mounted to the top portion of the antenna by friction fit with the aperture for providing an indication of a function of the terminal.

12. The portable communication terminal as recited in claim 11, wherein said light emitting diode is electrically connected to a lamp driver housed within the body portion.

13. An antenna unit for a portable communication terminal comprising:

an antenna housing which is configured to be mounted on a body of said portable communication terminal, the antenna housing having a top end, a bottom end, and an interior cavity extending along its length, the top end terminating in an aperture, the bottom end being mounted to the body of the terminal and being electrically connected to the body of the terminal by a conductive fitting;

an incoming call lamp mounted to the top end of the antenna housing by friction fit with the antenna housing; and a wire connection extending in the interior cavity of the antenna and electrically connecting the incoming call lamp to the conductive fitting.

* * * * *